United States Patent [19]

Sutton et al.

[11] Patent Number: 4,865,529

[45] Date of Patent: Sep. 12, 1989

[54] ROTOR TRANSIENT POSITIONING ASSEMBLY

[75] Inventors: Robert F. Sutton, Newbury Park; Robert F. Beatty, West Hills, both of Calif.

[73] Assignee: Rockwell International Corporation, El Segundo, Calif.

[21] Appl. No.: 324,971

[22] Filed: Mar. 20, 1989

Related U.S. Application Data

[63] Continuation of Ser. No. 128,560, Dec. 3, 1987, abandoned.

[51] Int. Cl.⁴ .............................................. F04B 17/00
[52] U.S. Cl. .................................... 417/409; 384/102; 384/610
[58] Field of Search ................ 417/409, 406, 405; 384/101, 102, 243, 244, 245, 556, 610, 611, 616, 617, 627

[56] References Cited

U.S. PATENT DOCUMENTS

| | | | |
|---|---|---|---|
| 3,360,310 | 12/1967 | Hiatt et al. | 384/102 |
| 3,642,331 | 2/1972 | Silver | 384/102 |
| 3,655,226 | 4/1972 | Cowan | 384/610 |
| 3,708,215 | 1/1973 | Wilcock et al. | 384/102 |
| 4,265,498 | 5/1981 | Luce et al. | 384/610 |
| 4,394,091 | 7/1983 | Klomp | 384/101 |
| 4,641,978 | 2/1987 | Kapich | 384/102 |

FOREIGN PATENT DOCUMENTS

| | | | |
|---|---|---|---|
| 0163720 | 10/1982 | Japan | 384/102 |
| 0393497 | 12/1973 | U.S.S.R. | 384/101 |

*Primary Examiner*—Carlton R. Croyle
*Assistant Examiner*—Timothy S. Thorpe
*Attorney, Agent, or Firm*—H. Fredrick Hamann; Harry B. Field; David C. Faulkner

[57] ABSTRACT

A turbopump assembly 10 including a pump section 12 and a turbine section 14 is provided with forward and aft shaft centerline containment assemblies 20,84 in combination with radial hydrostatic bearings 28,72, and seals 26 to support transient loads and center the shaft 22 within the housing at startup and shutdown.

5 Claims, 1 Drawing Sheet

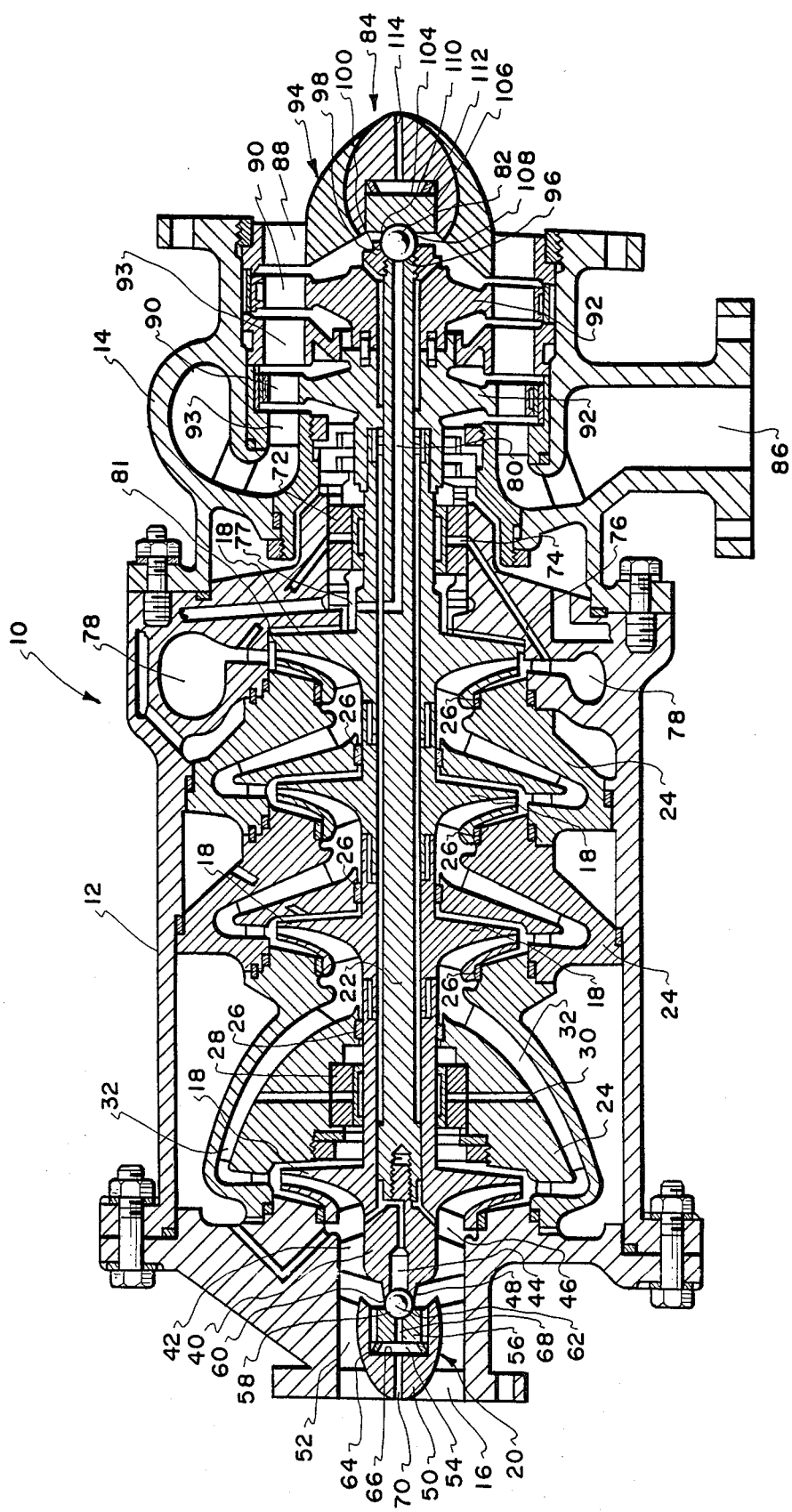

ROTOR TRANSIENT POSITIONING ASSEMBLY

STATEMENT OF GOVERNMENT INTEREST

The Government has rights in this invention pursuant to Contract (or Grant) No. F04611-86-C-0103 awarded by the U.S. Department of the Air Force.

This is a continuation of co-pending application Ser. No. 128,560 filed on Dec. 3, 1987, now abandoned.

BACKGROUND OF THE INVENTION

1. Field of the Invention

The present invention relates to high speed turbopumps and more particularly, to the replacement of standard rolling element bearings normally employed to fulfill rotor radial and axial support requirements and which limit the turbopumps functional life.

2. Description of the Prior Art

In known high speed turbomachinery, angular contact ball bearings have been utilized in supporting the rotor under high radial and axial loading. In some turbopumps load sharing seals in parallel with mechanical rolling element bearings have been utilized to limit radial loading. However, in some cases these seals cannot carry all the load required to extend the actual life beyond the desired operational life, thus bearing failure may still occur.

OBJECTS OF THE INVENTION

Accordingly, it is a primary object of the present invention to provide a turbopump having means for centering the rotor rotating assembly between the stator elements with the use of fluid film bearings and seals, while maintaining axial and radial restraints during turbopump startup and shutdown.

It is yet another object of the present invention to provide a turbopump assembly which limits the use of rolling element bearings.

SUMMARY OF THE INVENTION

All of these and other objects are achieved by the present invention which provides a rotating assembly including a pump section and a turbine section interconnected by a common shaft. At opposing ends of the shaft in the pump section and turbine section respectively, there is provided a shaft centerline containment assembly which provides axial and radial restraint at startup and shutdown of the turbopump while becoming disengaged during steady state operation.

The foregoing and other objects, features and advantages of the present invention will become more apparent in light of the following detailed description of the preferred embodiment thereof as illustrated in the accompanying drawing.

BRIEF DESCRIPTION OF THE DRAWING

FIG. 1 is a cross-section of a turbopump assembly in accordance with the present invention utilizing hydrostatic bearings and interstage seals to support high speed turbopump rotors during steady state operation while also providing thrust bearing pivots at each end of the rotor to counteract transient loads and center the rotor within the housing at startup and shutdown.

DESCRIPTION OF THE PREFERRED EMBODIMENT

The containment assemblies of this invention are illustrated in a turbopump assembly as shown in FIG. 1. The turbopump assembly 10 is made up of two main parts, a forward pump section 12 and an aft turbine section 14. The forward pump section 12 includes a fluid inlet 16 which communicates with an inducer 40 and impellers 18 located within the pump section.

As seen in the drawing, a forward shaft centerline containment assembly 20 is positioned between the fluid inlet 16 and the inducer 40 at the end of the shaft. A central shaft 22 communicates between the pump section 12 and turbine section 14. Associated with central shaft 22 are stators 24.

Interstage seals 26 and hydrostatic bearings 28 and 72, are provided to restrict recirculation flow and damp vibration and movement of the rotating components during operation. Coolant passages 44 and 80 provide cooling fluid to the thrust bearing spherical members 62 and 82 from chambers 46 and 77. Said spherical members 62 and 82 may be fabricated from a ceramic material.

The forward pump section 12 contains the forward shaft centerline containment assembly 20. Assembly 20 contacts the shaft inducer 40 having pumping vanes 42 connected thereto. A coolant passage 44 within the inducer 40 communicates with pumping chamber 46 and a concave recess 48 formed within the forward end of the inducer.

At the fluid inlet 16 of the pump section 12 there is provided an ellipsoid-shaped housing 50 forward of the inducer 40. The ellipsoid-shaped housing 50 includes flow directing vanes 52 and a chamber 54 to house the centerline system axial preload spring 64 within the ellipsoid-shaped housing. A forward annular pivot retainer 56 within the annular chamber 54 and a concave recess 58 is aligned with the concave recess 48 formed within the inducer 40 to form a unitary spherical recess. A spherical member 62 is retained in the pivot retainer.

The containment assembly forward axial preload spring 64 is positioned intermediate to the base portion 66 of the pivot retainer 56. An axial cooling passage 68 centrally traverses the pivot retainer 56 and opens at the base of the pivot retainer and at the concave recess 58 formed within the aft portion of the pivot retainer. Multiple coolant grooves 60 are included in the concave recess 58 to direct the coolant to the spherical member 62. An axial passage 70 is provided to communicate coolant, and centrally traverses the ellipsoid-shaped housing 50, opens into annular chamber 54, and then communicates through the pivot retainer 56 to the spherical member 62 and the pump section fluid inlet 16.

Referring again to the FIGURE and in particular to the aft turbine section 14, there is shown a hydrostatic bearing 72 and operating fluid passages 74. Hydrostatic bearing 72 functions to add radial support to integral shaft 22 during operation. Hydrostatic bearing operating fluid supply passages 76 are formed in the aft portion of the forward pump section housing 12 and pump discharge chamber 78. A shaft fluid coolant and lubricant passage 80 formed within the shaft 22 further communicates with aft spherical member 82 of the aft shaft centerline containment assembly 84 as more fully discussed below. An axial thrust balance piston 81 is formed between the fast pumping stage impeller 18 and the housing.

The aft turbine section 14 of the turbopump assembly 10 is provided with a turbine fluid inlet 86 and outlet 88 for admitting and expelling hot gas, or combinations of hot gas combustion products, into and out of the turbine. Turbine blades 90 are attached to turbine disk 92. Turbine flow nozzles 93 direct the drive gas into the successive stages of the turbine.

In the aft-most end of the turbine section is located the aft shaft centerline containment assembly 84. The aft shaft centerline containment assembly includes an aft containment housing 94. A shaft concave recess 96 is formed within the shaft 22 aft end. A rotor axial stackup securing nut 98 having a concave surface 100 is connected to the hollow shaft aft end. Concave recess 96 and concave surface 100 are aligned to form a unitary spherical recess contacting the aft spherical member 82 retained in cooperation with the aft containment housing 94.

The aft containment housing 94 includes an annular chamber 104 and aft annular pivot retainer piston 106. A concave recess 108 is formed within a forward portion of the aft pivot retainer 106 and the adjacent nut 98, and is aligned with the unitary spherical recess formed by the concave nut surface 100 and shaft concave recess 96. As previously noted, spherical member 82 contacts the hollow shaft aft end until steady state operation is attained. Multiple coolant grooves 110 are provided in the concave recess 96, the shaft nut concave recess 98 and the concave recess of the aft annular pivot member 106 to distribute the coolant fluid around the aft spherical member 82. Also provided is axial preload spring 112 located within annular chamber 104. In addition, an axial vent passage 114 is provided which traverses the center of the aft containment housing 94 and communicates with annular chamber 104 and turbine section fluid outlet 88.

At standby conditions, the turbopump may be provided with propellant at the pump inlet 16 which communicates throughout the internal turbopump channels to the turbopump discharge chamber 78, the shaft fluid coolant and lubricating passages 44 and 80, and the turbine housing cavity outlet 88.

During turbopump startup, the pump inlet 16 is pressurized to a value to provide the required minimum net positive suction head to the pumping components of the inducer 40 and the impellers 18 with shaft rotation beginning as hot gases are directed into the turbine inlet 86.

Transient operation begins as the inlet fluid pressure is raised through the pumping action of the inducer 40 and impellers 18 providing coolant to the forward and aft spherical members 62 and 82 and communicates with passages 44 and 80. Coolant fluid is also provided through the inlet passages 62 and 70. As the fluid pressure is increased in the pump discharge chamber 78 by the turbopump pumping components, a coolant flow is established in the aft coolant passage 80 and is communicated to the aft spherical member 82. The turbine drive gas provides the pressure necessary at the annular section of the exposed aft pivot retainer 108 which when combined with the pivot retainer frontal area there is provided a force to move the aft pivot retainer further aft to compress the aft axial preload spring 112. In concert with this, the balance piston 81 then pulls the rotor off the forward pivot 62. The total aft motion is small, perhaps as little as 0.010 inch but is sufficient to disengage the shaft 22 from the spherical members 62 and 82 contact areas of the pivot supports 56 and 106. Coincident with this operation, the hydrostatic bearings 28 and 72 become operative with the addition of the fluid supply pressure. The hydrostatic bearings and the interstage seals 26 then begin to provide the necessary operational centering of the shaft 22 and rotor components.

As previously mentioned, axial motion of the shaft during steady state operation is controlled by a balance piston 81, normally located at the last stage of pumping, which is provided between the impeller 18 and the forward pump housing 12. The balance piston is a pressure actuated self balancing device which is sized to accommodate the axial forces present in the turbopump. Typical axial motions of the shaft during all stages of motion are 0.010 inch. If the balance piston were to become inoperative or the axial motions are greater than predicted during operation, the centerline containment system assemblies would provide a restraint and prevent out-of-control rotor axial motions with both the forward and aft motions constrained by the pivot supports of the containment assemblies.

At system shutdown, the reverse process takes place with the aft pivot retainer moving forward and capturing the shaft between the two spherical members at the pump end and the turbine end. Radial rubbing of the rotor components against the housing, particularly the impellers and the hydrostatic bearings, is eliminated.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. In a turbopump assembly having a unitary housing comprising:
    a forward pump section including a fluid inlet; .
    an aft turbine section including a fluid inlet and outlet;
    a turbine disk with blades;
    a shaft supporting the turbine disks and extending axially from the turbine section into the pump section;
    impellers mounted on the shaft in the pump section;
    a balance piston;
    radial bearing means supporting the shaft; wherein the improvement comprises:
    a disengaging aft shaft centerline containment assembly;
    a disengaging forward shaft centerline containment assembly further comprising:
    a shaft forward end;
    a coolant passage communicating with the shaft and a concave recess;
    an ellipsoid-shaped housing positioned within a fluid inlet chamber;
    a spherical member retained between the shaft forward end and the ellipsoid-shaped housing within a unitary spherical recess;
    an annular chamber within the ellipsoid-shaped housing;
    a disengaging forward annular pivot retainer within the annular chamber;
    a concave recess including fluid flow grooves formed within the aft portion of the retainer nearest the shaft forward end and aligned with the concave recess formed at the forward end of the shaft;
    axial preload springs intermediate a base portion of the disengaging forward annular pivot retainer and a surface of the inner annular chamber;
    an axial cooling passage centrally traversing said pivot retainer and opening at the base portion of the pivot retainer and concave recess formed within the aft portion of said pivot retainer; and an axial vent passage centrally traversing the ellipsoid-shaped housing and opening into the annular chamber and pump section fluid inlet, said vent passage aligned with the axial vent passage centrally traversing the pivot retainer.

2. The turbopump assembly of claim 1 wherein the aft shaft centerline containment assembly further comprises:

an aft containment housing formed at an aft end of the turbine section;

a concave recess formed within the shaft aft end;

an aft annular chamber;

a disengaging aft annular pivot retainer within the annular chamber;

a rotor axial stackup securing nut having a concave hollow in a portion thereof connected to the shaft aft end, with the concave recess and concave hollow aligned together to form a unitary spherical recess;

a spherical member retained within the unitary spherical recess between the shaft aft end and the aft containment housing;

a concave recess formed within a forward portion of said pivot retainer nearest the rotor axial stackup securing nut and axially aligned with a unitary concave recess formed by a nut concave hollow recess formed within the shaft aft end;

a coolant passage communicating with said nut concave hollow recess;

fluid flow grooves at a surface of said pivot retainer proximate and communicating with said pivot retainer concave recess;

an axial preload spring intermediate a base portion of said aft annular pivot retainer and a surface of said inner annular chamber; and an axial vent passage centrally traversing the aft containment housing and opening into the aft end annular chamber.

3. The turbopump assembly of claim 1 wherein interstage sealing means, radial hydrostatic bearing means, and balance piston means are positioned along the turbopump shaft.

4. The turbopump assembly of claim 1 wherein the spherical member is fabricated from a ceramic material.

5. The turbopump assembly of claim 2 wherein the sperical member is fabricated from a ceramic material.

* * * * *